United States Patent [19]

Greulich et al.

[11] Patent Number: 4,798,178

[45] Date of Patent: Jan. 17, 1989

[54] COMPOUND CAMSHAFT AND METHOD OF MANUFACTURING THE SAME

[75] Inventors: Walter Greulich, Uhwiesen; Karl Gut, Benken; Klaus Hornung, Stein am Rhein, all of Switzerland; Güther Schulte, Volkertshausen, Fed. Rep. of Germany

[73] Assignee: Georg Fischer Aktiengesellschaft, Schaffhausen, Switzerland

[21] Appl. No.: 833,558

[22] Filed: Feb. 27, 1986

[30] Foreign Application Priority Data

Mar. 6, 1985 [CH] Switzerland .................. 1009/85

[51] Int. Cl.⁴ .................. F01L 1/46; F16H 53/00
[52] U.S. Cl. .................. 123/90.6; 29/156.4 R; 74/567; 228/135
[58] Field of Search .................. 123/90.27, 90.6; 29/156.4 R; 74/567; 228/135, 258

[56] References Cited

U.S. PATENT DOCUMENTS

| | | | |
|---|---|---|---|
| 4,597,365 | 7/1986 | Madaffer | 123/90.6 |
| 4,644,912 | 2/1987 | Omeha et al. | 123/90.6 X |
| 4,732,310 | 3/1988 | Omeha et al. | 228/135 |

FOREIGN PATENT DOCUMENTS

| | | |
|---|---|---|
| 1400964 | 11/1968 | Fed. Rep. of Germany . |
| 7047278 | 4/1971 | Fed. Rep. of Germany . |
| 2336241 | 2/1975 | Fed. Rep. of Germany ..... 123/90.6 |
| 8426999 | 12/1984 | Fed. Rep. of Germany . |
| 3490389 | 10/1985 | Fed. Rep. of Germany . |
| 211513 | 12/1983 | Japan .................. 123/90.6 |
| 275842 | 8/1927 | United Kingdom .......... 74/567 |
| 2099948 | 12/1982 | United Kingdom . |
| 2133104 | 7/1984 | United Kingdom . |

*Primary Examiner*—Tony M. Argenbright
*Attorney, Agent, or Firm*—Werner W. Kleeman

[57] ABSTRACT

The method of manufacturing the compound camshaft comprises the steps of placing cast journal or bearing elements and/or cast cam elements on a camshaft body and fixedly connecting or securing such elements at the camshaft body. The cast journal or bearing elements and/or the cam elements contain an opening which is bounded by an internal profile or contour having a configuration which is governed by the type of connection to be made between such elements and the camshaft body. The internal profile or contour may be of a substantially conical shape and is at least partially left in a mechanically untreated condition. The compound camshaft thus obtained is optimized with respect to wear and weight and there are neither required cost-intensive and time-consuming operations, especially machining operations, nor complicated working steps during the manufacturing process.

46 Claims, 2 Drawing Sheets

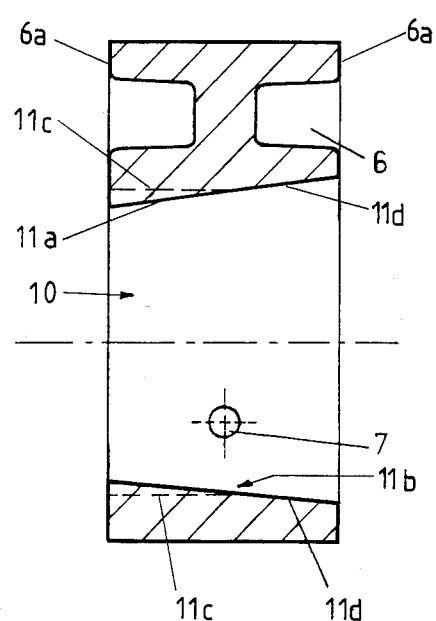

COMPOUND CAMSHAFT AND METHOD OF MANUFACTURING THE SAME

BACKGROUND OF THE INVENTION

The present invention relates to a new and improved method of manufacturing a compound camshaft. The present invention also relates to a new and improved construction of a compound camshaft which is obtained by carrying out the aforementioned inventive method.

In its more particular aspects, the present invention specifically relates to a new and improved method of manufacturing a compound camshaft and which method includes the steps of placing journal or bearing elements and/or cam elements on a camshaft body or camshaft element and fixedly connecting or securing the journal or bearing elements and/or the cam elements with such camshaft body or camshaft element.

The most various methods are known for manufacturing camshafts. For example, camshafts may be cast in one piece. Also, the cam elements and the other elements of the compound camshaft and the camshaft body itself can be separately manufactured and subsequently interconnected, for example, by welding or bolting or by any other known appropriate connecting method. Furthermore, and in order to achieve savings in weight, the camshafts obtained by either one of the aforementioned methods are bored-out or drilled-out. Such multi-step procedures are currently in general use, however, they have been found to be very cost-intensive and time-consuming.

It is further known to the art that under the tribological or frictional conditions which prevail during operation of a cam or camshaft drive, chill-cast cams possess the highest wear resistance.

According to a method of manufacturing compound camshafts as known, for example, from German Patent Publication No. 2,922,509, the journal or bearing elements for a support tube which constitutes the camshaft body and the cam elements are separately manufactured and subsequently interconnected in a force-locking manner and/or in a form-locking manner. The journal or bearing elements and the cam elements are connected with the support tube primarily by employing a soldering or so-called out-shrinking operation. During such soldering or out-shrinking operation, the profile or contours of the support tube carrying the journal or bearing elements and the cam elements must be machined into the related sections of such support tube constituting the camshaft body. Apart from the fact that such measures or steps require a comparatively great amount of work, it is not entirely apparent from this suggested prior art manufacturing method in which manner the soldering operation is intended to be carried out.

SUMMARY OF THE INVENTION

Therefore, with the foregoing in mind, it is a primary object of the present invention to provide a new and improved method of manufacturing a compound camshaft and which method is optimized with respect to wear and weight of the thus manufactured compound camshaft.

Another important object of the present invention aims at providing a new and improved method of manufacturing a compound camshaft and which method does not require any cost-intensive and time-consuming operations and is also devoid of any operational steps which require a great amount of work.

Still a further significant object of the present invention is directed to a new and improved method of manufacturing a compound camshaft and which method achieves significant savings in weight accompanied by great wear resistance of the compound camshaft.

Still another important object of the present invention aims at providing a new and improved construction of a compound camshaft which is not afflicted with the drawbacks and limitations of the prior art constructions heretofore discussed.

Another noteworthy object of the present invention is directed to a new and improved construction of a compound camshaft body which is optimized with respect to wear and, furthermore, has a significantly lower weight than prior art camshaft constructions and yet possesses a very high wear resistance.

Now in order to implement these and still further objects of the invention, which will become more readily apparent as the description proceeds, the compound camshaft manufacturing method of the present invention is manifested by the features that, the journal or bearing elements and/or the cam elements are manufactured by employing a casting process. The internal profile or contour of each one of these cast elements is configured in correspondence to the intended connection to be made with the camshaft body and such internal profile or contour remains at least partially untreated, that is, such cast elements are not mechanically treated at least over a predominant portion of their internal profile or contour following the casting operation and prior to being fixedly connected or secured to the camshaft body.

As already alluded to above, the invention is not only concerned with the aforementioned compound camshaft manufacturing method, but also relates to an improved construction of a compound camshaft which contains a camshaft body or camshaft element and journal or bearing elements and/or cam elements which are fixedly connected or secured to the camshaft body or camshaft element.

In order to achieve the aforementioned objects the journal or bearing elements and/or the cam elements constitute cast journal or bearing elements and cast cam elements which contain an internal profile or contour configured in correspondence with the intended type of interconnection between such cast elements and the camshaft body or camshaft element. The internal profile or contour of each one of the journal or bearing elements and/or the cam elements is in an at least partially untreated condition, i.e. a condition in which at least a predominant portion of the internal profile or contour is not mechanically treated.

While it is preferable to not mechanically treat or machine the internal profile or contour of the cast elements at all, benefits in the saving in manufacturing costs can still be realized if at least one-half of such internal profile or contour is not mechanically treated or machined and it is in this sense that there is employed the aforesaid term "at least a predominant portion".

Appropriate soldering materials or appropriately selected adhesive bonding agents can be used for forming a secure bonding connection or bond between the camshaft body and the journal or bearing elements and/or the cam elements of the inventive compound camshaft.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 3 is a view similar to FIG. 2a but depicting a modified construction of a cam element.

DETAILED DESCRIPTION OF THE PREFERRED EMBODIMENTS

Figure 1:
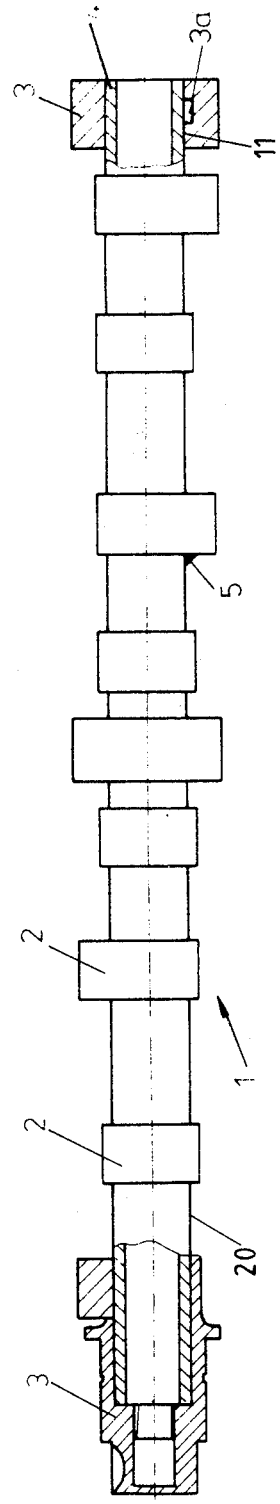
FIG. 1 is a partially sectional view of an exemplary embodiment of the inventive compound camshaft fabricated in accordance with the inventive method.

Describing now the drawings, it is to be understood that to simplify the showing thereof, only enough of the construction of the inventive compound camshaft has been shown as is needed to enable one skilled in the art to readily understand the underlying principles and concepts of the present invention. Turning attention now specifically to FIG. 1 of the drawings, there has been shown in a partially sectional view, a compound camshaft 1 which has been manufactured by carrying out the inventive method which will be explained in more detail hereinbelow. This compound camshaft 1 contains cams or cam elements 2 and journal or bearing elements 3. The cams or cam elements 2 and the journal or bearing elements 3 are pre-fabricated from preferably a metal alloy possessing predetermined strength and wear characteristics. The material from which the cams or cam elements 2 and the journal or bearing elements 3 are pre-fabricated, is selected in accordance with the requirements made by the tribological or frictional properties of the system in which the compound camshaft 1 is intended to be used, particularly with respect to achieving appropriate wear resistance. The cams or cam elements 2 are cast elements, preferably chilled castings possessing a hardness in the range of about 30 to about 75 HRC, preferably a hardness in the range of about 45 to about 55 HRC.

The cams or cam elements 2 and the journal or bearing elements 3 are placed at related predetermined positions on a pre-fabricated camshaft body or camshaft element 20 and thereafter are fixedly connected therewith in a manner still to be described hereinafter in detail. In the illustrated preferred embodiment, the camshaft body or camshaft element 20 constitutes a hollow camshaft body or tube 4.

The cast cams or cam elements 2, the cast journal or bearing elements 3 and the hollow camshaft body or tube 4 can be combined in any appropriate manner as concerns the materials from which these parts are pre-fabricated, and they are selected such as to satisfy the momentary requirements in an optimum manner. Correspondingly, the hollow camshaft body or tube 4 may be pre-fabricated, for example, from appropriate metallic materials like steel or from appropriately selected plastic materials, specifically, glass-fiber reinforced plastic materials or aramid reinforced plastic materials. The hollow camshaft body or tube 4 can be fabricated from a cold-drawn tube which, if desired, can be additionally normalized.

As already explained hereinbefore, the cams or cam elements 2 are manufactured by employing any suitable casting process. Various known casting methods are suitable for this purpose and the casting operation may be performed, for example, by permanent-mold casting or chill casting, sand mold casting or precision casting. Specifically, the cams or cam elements 2 are manufactured employing a stack casting method in order to ensure an economical manufacturing process.

Figure 2:
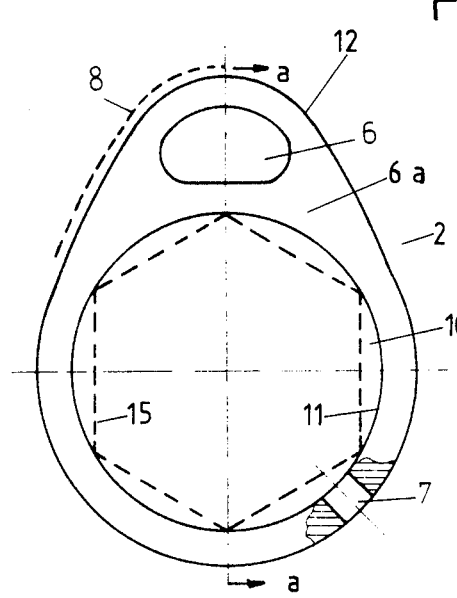
FIG. 2 is a side view looking at one end face as an individual cam element of the compound camshaft shown in FIG. 1.
Figure 2A:
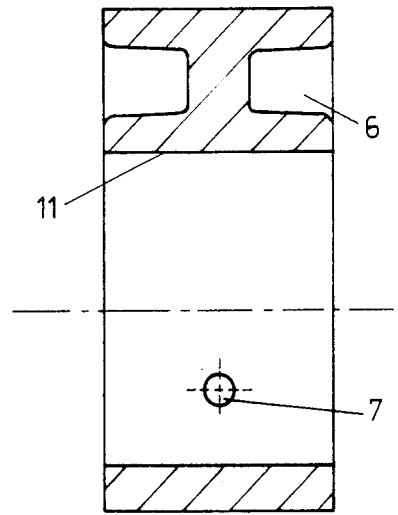
FIG. 2a is a cross-section thereof taken substantially along the line a—a in FIG. 2.

As best seen by referring to FIG. 2, each one of the aforementioned cams or cam elements 2 and journal or bearing elements 3 contains an inner opening 10 which is bounded by an internal profile or contour 11 having a predetermined axial length and which receives therein the camshaft body or tube 4. The internal profile or contour 11 is specifically configured in correspondence with the intended type of connection which is employed for interconnecting the cams or cam elements 2 and the journal or bearing elements 3 with the camshaft body or tube 4. In particular, the internal profile or contour 11 of each such element 2 and 3 may possess a substantially cylindrical configuration, a substantially conical configuration, or a suitable combination of a substantially cylindrical configuration and substantially conical configuration. In FIG. 2a, there is shown one of the cast elements, here a cam element having a substantially cylindrical internal profile or contour 11, whereas in FIG. 3 such element is shown to possess a substantially conical or truncated conical internal profile or contour 11a. An example of the combined cylindrical and conical configuration is indicated by the broken line 11b in FIG. 3. As illustrated, a substantially cylindrical part 11c and a substantially truncated conical part 11d of such combined configuration extend from opposite ends of the opening 10 in the cam or cam element 2. The tuncated conical configuration 11d tapers towards the interior of the opening 10 such that the cylindrical part 11c and the truncated conical part 11d merge at an appropriately selected location intermediate the opposite ends of the opening 10 or intermediate the opposite end faces 6a of the cam element 2 such that there results in effect, a substantially funnel-shaped configuration. This combined cylindrical and conical configuration 11b can also be provided at the journal or bearing elements 3.

The aforementioned substantially conical or truncated conical internal profile or contour 11a or the truncated conical part 11d of the aforementioned combined configuration 11b is defined by a predetermined appropriately selected base diameter and a predetermined apex diameter, with the apex diameter having a dimension in the range of about 85% to about 95%, preferably approximately 90% of the base diameter. The internal diameter of the truncated conical internal profile 11a is selected in relation to the outer diameter of the camshaft body or tube 4 such that there are obtained the beneficial effects of the capillary action referred to further hereinbelow. This dimensional selection depends upon the bonding or soldering technique employed and can be readily experimentally determined from case to case. The internal profile or contour 11 or 11a of the cast cam elements 2 and the cast journal elements 3 are not mechanically treated at least over a predominant portion of their internal profile or contour following the casting operation and prior to fixation at the camshaft body or tube 4.

Additionally, there can be provided a recess or pocket 3a which extends at least partially along the circumference and over a part of the axial length of the internal profile or contour 11 of the related cast element 2 or 3. Such recess or pocket 3a is specifically illustrated for one of the journal or bearing elements 3 in FIG. 1 of the drawings. However, this recess or pocket 3a can be provided in the same manner in each one of the cast cams or cam elements 2 and in each one of the cast journal or bearing elements 3 which are connected to the camshaft body or tube 4.

The recess or pocket 3a serves as a depot or reservoir and receives a suitable bonding agent like, for example, soldering material. Such soldering material may constitute hard-soldering or brazing material or wire and may also constitute soft-soldering material or wire, as the case may be. An appropriately selected soldering wire is placed into the recess 3a of each cast cam or cam element 2 and each cast journal or bearing element 3 before such element is slid or placed upon the camshaft body or tube 4. Thereafter, heat is appropriately applied, such as by using inductive heating or laser radiation, and the soldering material or wire is melted or fused for producing the desired positive bonding or soldering connection between the cast cams or cam elements 2 and the cast journal or bearing elements 3, as the case may be, and the camshaft body or tube 4.

Prior to connecting each cam or cam element 2 with the camshaft body or tube 4, it may be preferable to initially secure each such element at a respective predetermined location of the camshaft body or tube 4 prior to the soldering operation. Such initial secured placement of each such element at the camshaft body or tube 4 can be effected by spot welding at a respective precisely defined welding spot 5 which is selected such that no changes are produced in the grain structure of the chilled casting which constitutes the cam or cam element 2. In this manner each one of such cast elements 2 and 3 is also fixed in its axial position as well as in its angular position relative to the camshaft body or tube 4.

Instead of employing soldering material as the bonding agent for producing the bonding connection between the camshaft body or tube 4 and the cams or cam elements 2 and the journal or bearing elements 3, an appropriately selected adhesive bonding agent may also be employed for producing such bonding connection between the camshaft body or tube 4 and the aforementioned elements. In such case, the recesses or pockets 3a serve as depots or reservoirs for the appropriately selected adhesive bonding agent.

In a further modification of the method used for connecting the camshaft body or tube 4 with the cast cams or cam elements 2 and the cast journal or bearing elements 3, a conventional shrinking method may be employed for producing the bonding connection or bond between the camshaft body or tube 4 and such cast elements 2 and 3.

The cast cams or cam elements 2 and the cast journal or bearing elements 3 which possess the substantially truncated conical internal profile or contour 11a or the combined subtantially cylindrical and substantially truncated conical internal profile or contour 11b as indicated in FIG. 3, are bonded or secured to the camshaft body or tube 4 by the soldering material or bonding agent which extends through the substantially conical intervening gap between each such cast element 2 and 3 and the camshaft body or tube 4. If desired, the internal profile or contour 11a may also contain a depot or reservoir for the soldering material or bonding agent and which depot or reservoir may be structured and arranged analogous to the recess or pocket 3a illustrated in FIG. 1.

In the heretofore described embodiments, the internal profile or contour 11 or 11a or 11b of the cast cams or cam elements 2 and of the journal or bearing elements 3 has a cylindrical or truncated conical configuration or combined cylindrical and truncated conical configuration, as the case may be, and the camshaft body or tube 4 has a substantially cylindrically configured circumferential surface. However, the camshaft body or tube 4, if desired, may also possess a different, such as a polygonally configured circumferential surface like, for example, the hexagonal configuration 15 illustrated in cross-section by broken lines in FIG. 2. In such case, the internal profile or contour of the cast cams or cam elements 2 and the journal or bearing elements 3 may retain the aforedescribed cylindrical or truncated conical or funnel-shaped combined cylindrical and truncated conical configuration, as the case may be, but may also be complementary shaped relative to the aforedescribed polygonal profile or configuration of the camshaft body or tube 4. In all of these cases, the different elements are bonded or interconnected substantially in the manner as described hereinbefore.

As specifically illustrated in FIGS. 2 and 2a, the cams or cam elements 2 are provided with recesses 6 in the end faces 6a, specifically in the lifting or apex region 8 of such cams or cam elements 2. The recesses 6 contribute to the desirable saving of weight. Furthermore, the recesses 6 facilitate the handling of the cams or cam elements 2 due to the fact that the individual cam elements 2 can be more easily gripped and can be exactly positioned at their respective predetermined position on the camshaft body or tube 4 prior to the bonding or connecting operation.

The inventive compound camshaft 1 is preferably manufactured, for example, according to the following method:

A low-melting hard-soldering or brazing wire is placed into the recess or pocket 3a of a pre-selected cast cam element 2 or journal or bearing element 3 which is intended to be connected with the camshaft body or tube 4 and which contains such recess 3a at the internal profile or contour 11 or 11a or 11b, as the case may be, which bounds the internal opening 10. The recess or pocket 3a, as stated, constitutes a depot or reservoir for the hand-soldering or brazing wire. The cast element 2 or 3 is pre-fabricated by an appropriately selected one of the aforementioned conventional casting processes and the internal profile or contour 11 or 11a or 11b of such cast element 2 or 3 is at least partially left untreated as previously explained. The cast element 2 or 3 containing the hard-soldering or brazing wire in the recess or pocket 3a is placed onto the camshaft body or tube 4 at the respective predetermined or desired position and initially fixed in place by the provision of the associated welding spot 5.

After all of the cst cam elements 2 and the journal bearing elements 3 have been prepared and placed initially positionally fixed on the camshaft body or tube 4 at their respective predetermined positions, the camshaft body or tube 4 is appropriately retained or fixed in a predetermined position and, for example, a conventional induction heating device is used for melting the hard-soldering or brazing wire. Such induction heating device may act on only one of the cam elements 2 or the journal or bearing elements 3 or may also be constructed such as to simultaneously act upon a preselected group of such cast elements. In any case, the induction heating devie is displaced after each soldering operation from one element or group of elements, as the case may be, to the next element or group of elements in order to sequentially perform the connecting or bonding operations on the different cams or cam elements 2 and journal or bearing elements 3.

It should be noted that substantially the same method is employed for connecting or bonding cams or cam elements 2 and/or journal or bearing elements 3 which are provided with a substantially truncated conical internal profile or contour 11a or the funnel-shaped combined cylindrical and truncated conical internal profile or contour 11b as shown in FIG. 3 and which may or may not possess a recess or pocket like, for example, the recess or pocket 3a shown in FIG. 1. If no such recess or pocket 3a is used, then the hard-soldering or brazing wire is located in the intervening gap or space which exists between each one of such elements 2 or 3, as the case may be, and the outer surface of the camshaft body or tube 4. During the heating operation, the melted hard-soldering or brazing material is subject to a variable capillary action or pressure due to the substantially truncated conical configuration of the internal profile or contour 11a, or 11d. Such variable capillary action or pressure is beneficially utilized for producing a substantially perfect soldering interconnection extending substantially throughout such entire intervening gap or space which is formed between the cam or cam element 2 or the journal or bearing element 3, as the case may be, and the outer surface of the camshaft body or tube 4.

It is a particular advantage of the inventive method of manufacturing the compound camshaft 1 that the internal profiles or contours 11 or 11a or 11b of the cams or cam elements 2 and of the journal or bearing elements 3 can be left at least partially substantially mechanically untreated or non-machined, as heretofore described, after such elements have been produced by an appropriately selected one of the aforementioned conventional casting processes. Other types of treatment, specifically chemical treatments like, for example, deoxidizing or decarburizing treatments of the cast cams or cam elements 2 can be performed since such chemical treatments improve the welding and soldering operations.

Furthermore, and as illustrated in FIGS. 2 and 2a, the cams or cam elements 2 may be cast in such a manner that there is preferably formed a cast-in lubrication passage or bore 7 for lubricating the outer surface 12 of such cams or cam elements 2. When such lubricating passages 7 in the individual cams or cam elements 2 are employed in conjunction with a hollow camshaft body or tube 4 possessing a substantially cylindrical outer surface, and through which hollow camshaft body or tube 4 there may be forced, as by pumping, a suitable lubricant, such as lubricating oil, from one end thereof to the opposite end, then such substantially cylindrical hollow camshaft body or tube 4 may be advantageously provided with suitable passages or bores which are aligned with the cast-in lubricating passages or bores 7 of the cam or cam elements 2. Hence, the lubricant flowing through the internal space of the hollow cylindrical camshaft body or tube 4 may readily flow through these aligned passages or bores and effectively lubricate the outer surface 12 of the related cam or cam element 2. On the other hand, if there is used a camshaft body or tube 4 having a polygonal outer configuration, such as the hexagonal configuration 15 depicted in FIG. 2 in conjuction with cam elements 2 whose internal opening 10 either possesses a substantially cylindrical configuration or else a substantially truncated conical internal profile or contour 11a or the funnel-shaped combined cylindrical and truncated conical internal profile or contour 11b, then in such case, the cast-in lubrication passages 7 of the cam elements 2 can be omitted. In this case, the lubricant which is forced through the internal space of the hollow camshaft body or tube 4 from one end thereof to the opposite end can flow along the outer surface of the polygonal camshaft body or tube 4 and through the intervening spaces between such polygonal outer surface and the inner wall of the related cam elements 2 and thus effectively lubricate the outer surface 12 of such cam elements 2.

The method of manufacturing the compound camshaft 1 as described hereinbefore permits achieving a significant reduction in weight. At the same time, there are achieved high torsional and bending strengths. Also, there is provided a structure which permits lubrication of the compound camshaft 1. It is a very important advantage of the method described hereinbefore that the operational expenditure for manufacturing the compound camshaft 1 remains small as compared with hitherto known manufacturing methods.

While there are shown and described present preferred embodiments of the invention, it is to be distinctly understood that the invention is not limited thereto, but may be otherwise variously embodied and practiced within the scope of the following claims.

What we claim is:

1. A method of manufacturing a compound camshaft comprising the steps of:

casting a predetermined number of elements;

pre-fabricating a camshaft body;

said step of casting said predetermined number of elements entailing the step of providing each said cast element with an opening and an internal contour having a predetermined axial length which bounds said opening which is configured over at least a predeterminate portion of said predetermined axial length in accordance with the type of connection to be made between said element and said camshaft body;

said internal contour of each one of said cast elements not being mechanically treated at least over a predominant portion of said internal contour;

said internal contour of each one of said cast elements and when seated upon said camshaft body being situated in sufficiently close proximity to said camshaft body so as to define an intervening space extending substantially over the predetermined axial length of the cast element providing a capillary action for a bonding agent for fixedly connecting said predetermined number of cast elements with said camshaft body;

placing a bonding agent at one end region of said intervening space of each of said predetermined number of cast elements for fixedly connecting said predetermined number of cast elements with said camshaft body; and fixedly connecting said predetermined number of cast elements with said camshaft body by means of said bonding agent by causing said bonding agent placed at said one end region of said intervening space of each of said predetermined number of cast elements to flow towards an opposite end region thereof along the predetermined axial length of each cast element under the effect of said capillary action at the region of said internal contour of each one of said cast elements which have not been mechanically treated at least over said predominant portion of said internal contour.

2. The method as defined in claim 1, wherein:

said step of pre-fabricating said camshaft body entails the step of pre-fabricating a profiled camshaft body possessing a predetermined profile; and said step of casting said elements entails casting said elements with an internal contour configured substantially complementary to said predetermined profile of said profiled camshaft body.

3. The method as defined in claim 1, wherein:

said step of fixedly connecting said predetermined number of cast elements with said camshaft body by means of said bonding agent entails the step of connecting said predetermined number of cast elements with said camshaft body by brazing under the effect of said capillary action.

4. The method as defined in claim 3, further including the steps of:

providing at least one recess in said internal contour bounding said opening in each one of said predetermined number of cast elements; and prior to brazing, placing a predetermined amount of brazing material constituting said bonding agent in said at least one recess provided in said internal contour of each one of said predetermined number of cast elements.

5. The method as defined in claim 4, wherein:

during said step of placing said predetermined amount of brazing material in said at least one recess, placing a solid brazing material in said at least one recess; and during said step of fixedly connecting said cast elements to said camshaft body by brazing, using laser radiation for carrying out said brazing operation.

6. The method as defined in claim 4, wherein:

during said step of placing said predetermined amount of brazing material in said at least one recess, placing a solid brazing material in said at least one recess; and during said step of fixedly connecting said cast elements with said camshaft body by brazing, using inductive heating for carrying out said brazing operation.

7. The method as defined in claim 1, wherein:

said step to fixedly connecting said predetermined number of cast elements with said camshaft body by means of said bonding agent entails the step of connecting said predetermined number of cast elements with said camshaft body by soft-soldering.

8. The method as defined in claim 7, further including the steps of:

providing at least one recess in said internal contour of each one of said predetermined number of cast elements; and prior to soft-soldering, placing a predetermined amount of soft-soldering material constituting said bonding agent in said at least one recess provided in said internal contour of each one of said predetermined number of cast elements.

9. The method as defined in claim 8, wherein:

during said step of placing said predetermined amount of soft-soldering material in said at least one recess, placing a solid soft-soldering material in said at least one recess; and during said step of fixedly connecting said cast elements to said camshaft body by soft-soldering, using laser radiation for carrying out said soft-soldering operation.

10. The method as defined in claim 8, wherein:

during said step of placing said predetermined amount of soft-soldering material in said at least one recess, placing a solid soft-soldering material in said at least one recess; and during said step of fixedly connecting said cast elements with said camshaft body by soft-soldering, using inductive heating for carrying out said soft-soldering operation.

11. The method as defined in claim 1, wherein:

said step of fixedly connecting said predetermined number of cast elements with said camshaft body entails the step of adhesively bonding said predetermined number of cast elements with said camshaft body.

12. The method as defined in claim 11, further including the steps of:

providing at least one recess in said internal contour of each one of said predetermined number of cast elements; and prior to bonding said cast elements, placing a predetermined amount of an adhesive bonding agent constituting said bonding agent in said at least one recess provided in said internal contour of each one of said predetermined number of cast elements.

13. The method as defined in claim 1, wherein:

said step of fixedly connecting said predetermined number of cast elements with said camshaft body entails the step of shrinking said predetermined number of cast elements onto said camshaft body.

14. The method as defined in claim 1, wherein:

said step of providing each one of said predetermined number of cast elements with an opening and an internal contour entails the step of providing each one of said predetermined number of cast elements with a substantially cylindrical internal contour.

15. The method as defined in claim 1, wherein:

said step of providing each one of said predetermined number of cast elements with an opening and an internal contour entails the steps of providing each one of said predetermined number of cast elements with a substantially truncated conical internal contour.

16. The method as defined in claim 1, wherein:

said step of providing each one of said predetermined number of cast elements with an opening and an internal contour entails the step of providing each one of said predetermined number of cast elements with a combined substantially cylindrical and a substantially trucated conical internal contour such that a substantially cylindrical part and a substantially truncated part extend from opposite ends of said opening and merge at a preselected location between opposite ends of said opening.

17. The method as defined in claim 1, wherein:

said step of pre-fabricating said camshaft body entails the step of cold-drawing a hollow camshaft body.

18. The method as defined in claim 1, further including the step of:

preselecting cast journal elements as said cast elements to be fixedly connected with said camshaft body.

19. The method as defined in claim 1, further including the step of:
preselecting cast cam elements as said cast elements to be fixdly connected with said camshaft body.

20. The method as defined in claim 19, wherein:
said step of casting said cam elements entails casting said cam elements from a wear-resistant material possessing a hardness in the range of about 45 to about 55 HRC.

21. The method as defined in claim 19, wherein:
said step of casting said cam elements includes the step of providing recesses in a predetermined apex region of each one of said cast cam elements in end faces of such predetermined apex region.

22. The method as defined in claim 19, further including the steps of:
using a hollow camshaft body as said camshaft body; and
said step of casting said cam elements entailing the step of casting a pre-selected number of said cast cam elements with the inclusion of at least one cast-in lubricating passage.

23. The method as defined in claim 19, further including the steps of:
de-oxidizing and decarburizing said cast cam elements as said internal contour thereof; and
said steps of deoxidizing and decarburizing said cast cam elements being performed prior to fixedly connecting said cast cam elements with said camshaft body.

24. A method of manufacturing a compound camshaft, comprising the steps of:
casting a predetermined number of elements;
said step of casting said predetermined number of elements entailing the step of providing each one of said predetermined number of cast elements with an opening and a substantially truncated conical internal contour having a predetermined axial length and which bounds at least part of said opening along said predetermined axial length;
pre-fabricating a camshaft body;
placing said predetermined number of cast elements in related predetermined positions on said pre-fabricated camshaft body such that said substantially truncated conical internal contour of said predetermined number of cast elements and said camshaft body define therebetween respective substantially conical intervening spaces producing a capillary action for a bonding agent;
placing a bonding agent at one end region of said substantially conical intervening space of each of said predetermined number of cast elements for fixedly connecting said predetermined number of cast elements with said camshaft body; and
fixedly connecting said predetermined number of cast elements with said pre-fabricated camshaft body in said related predetermined positions of said predetermined number of cast elements on said pre-fabricated camshaft body by means of the bonding agent, by causing said bonding agent placed at said one end region of said substantially conical intervening space of each of said predetermined number of cast elements to flow, under the effect of said capillary action in said substantially conical intervening spaces, from said one end region thereof to an opposite end region thereof.

25. The method as defined in claim 24, wherein:
said step of providing each one of said predetermined number of cast elements with an opening and the substantially truncated conical internal contour entails the step of providing each one of said predetermined number of cast elements with a combined substantially cylindrical and substantially truncated conical internal contour such that a substantially cylindrical part and a substantially truncated part extend from opposite ends of said opening and merge at a preselected location between opposite ends of said opening.

26. The method as defined in claim 24, further including the step of:
using as said bonding agent located in said substantially truncated conical intervening spaces a soldering material.

27. The method as defined in claim 24, wherein:
said substantially truncated internal contour of each one of said cast elements not being mechanically treated at least over a predominant portion of said internal contour.

28. A compound camshaft comprising:
a camshaft body;
a predetermined number of cast elements fixedly connected to said camshaft body at related predetermined positions;
each one of said predetermined number of cast elements possessing an opening and an internal contour having a predetermined axial length;
said internal contour bounding said opening in each one of said predetermined number of cast elements and being configured at least along a part of said predetermined axial length in accordance with the type of connection made between said camshaft body and said cast element;
said internal contour of each one of said cast elements being situated in sufficiently close proximity to said camshaft body so as to define between each cast element and the camshaft body an intervening space providing a capillary action for a bonding agent for fixedly connecting said predetermined number of cast elements with said camshaft body;
each internal contour of each one of said predetermined number of cast elements possessing over at least a predominant portion of said internal contour a mechanically untreated condition; and
each one of said predetermined number of cast elements being fixedly connected by the bonding agent under the effect of the capillary action, prevailing in each of said intervening spaces from one region thereof towards an opposite end region thereof and between said internal contour of each one of said predetermined number of cast elements and said camshaft, with said camshaft body by means of a bonding agent fixedly bonding said cast elements to said camshaft body.

29. The compound camshaft as defined in claim 28, wherein:
each one of said predetermined number of cast elements contains at least one cast-in lubrication passage.

30. The compound camshaft as defined in claim 28, wherein:
said camshaft body constitutes a hollow camshaft body.

31. The compound camshaft as defined in claim 30, wherein:
   said hollow camshaft body possesses a predetermined profile.

32. The compound camshaft as defined in claim 31, wherein:
   said internal contour bounding said opening in each one of said predetermined number of cast elements possessing a profile which is substantially complementary configured to said predetermined profile of said hollow camshaft body.

33. The compound camshaft as defined in claim 30, wherein:
   said hollow camshaft body constitutes a cold-drawn hollow camshaft body.

34. The compound camshaft as defined in claim 30, wherein:
   said hollow camshaft body is made of a plastic material.

35. The compound camshaft as defined in claim 34, wherein:
   said plastic material constitutes glass-fiber reinforced plastic material.

36. The compound camshaft as defined in claim 34, wherein:
   said plastic material constitutes aramid-reinforced plastic material.

37. The compound camshaft as defined in claim 28, wherein:
   said bonding agent constitutes a soldering material.

38. The compound camshaft as defined in claim 28, wherein:
   said bonding agent constitutes an adhesive bonding agent.

39. The compound camshaft as defined in claim 28, wherein:
   said internal contour bounding said opening in each one of said predetermined number of cast elements constitutes a substantially cylindrical internal contour.

40. The compound camshaft as defined in claim 28, wherein:
   said internal contour bounding said opening in each one of said predetermined number of cast elements constitutes a substantially truncated conical internal contour.

41. The compound shaft as defined in claim 28, wherein:
   said internal contour bounding said opening in each one of said predetermined number of cast elements constitutes a combined substantially cylindrical and substantially truncated conical internal contour such that a substantially cylindrical part and a substantially truncated conical part of said combined internal contour extend from opposite ends of said opening and merge at a preselected location in said opening.

42. The compound camshaft as defined in claim 28, wherein:
   said predetermined number of cast elements contains a preselected number of cast cam elements constituting such cast elements.

43. The compound camshaft as defined in claim 42, wherein:
   each one of said pre-selected number of cast cam elements possesses a predetermined apex region and end faces; and
   each one of said pre-selected number of cast cam elements being provided with related recesses in said end faces at a location neighboring said predetermined apex region.

44. A compound camshaft comprising:
   a camshaft body;
   a predetermined number of cast elements fixedly connected to said camshaft body at related predetermined positions;
   each one of said predetermined number of cast elements possessing an opening and an internal contour having a predetermined axial length and possessing a substantially truncated conical configuration;
   each one of said predetermined number of cast elements defining a substantially truncated conical intervening space between each said cast element and the camshaft body through which there can flow by capillary action from one end region to an opposite end region of each substantially truncated conical intervening space a bonding agent for interconnecting said predetermined number of cast elements with said camshaft body;
   each one of said predetermined number of cast elements being fixedly connected at its related predetermined position with said camshaft body by means of the bonding agent fixedly bonding each said cast element to said camshaft body over at least a substantial portion of said predetermined axial length of said internal contour possessing said substantially truncated conical configuration due to the capillary action which is effective in a liquid state of said bonding agent during the process of fixedly bonding each said cast element to said camshaft body.

45. The compound camshaft as defined in claim 44, wherein:
   said internal contour of substantially truncated conical configuration constitutes a combined substantially cylindrical and substantially truncated conical internal contour such that a substantially cylindrical part and a substantially truncated conical part of said combined internal contour extend from opposite ends of said opening and merge at a preselected location between opposite ends of said opening.

46. The compound camshaft as defined in claim 44, wherein:
   said capillary action between said internal contour of substantially truncated conical configuration of each one of said predetermined number of cast elements and said camshaft body provides a positive connection due to the presence of a variable pressure along said predetermined axial length of said internal contour between each one of said predetermined number of cast elements and said camshaft body.

* * * * *